United States Patent [19]

Lucia

[11] Patent Number: 4,848,625
[45] Date of Patent: Jul. 18, 1989

[54] VACUUM BOTTLE HOLDER

[76] Inventor: Peter W. Lucia, 3310 Reamer Rd., Lapeer, Mich. 48446

[21] Appl. No.: 121,530

[22] Filed: Nov. 17, 1987

[51] Int. Cl.⁴ .............................................. B62V 11/00
[52] U.S. Cl. ................................... 224/250; 224/148; 224/253; 224/901
[58] Field of Search ............... 224/148, 250, 253, 901, 224/904

[56] References Cited

U.S. PATENT DOCUMENTS

| | | | |
|---|---|---|---|
| 1,605,195 | 11/1926 | Lewis | 224/148 |
| 2,524,639 | 10/1950 | Saunders | 224/250 X |
| 3,369,723 | 2/1968 | Saari et al. | 224/148 |
| 3,401,857 | 9/1968 | Wilson et al. | 224/253 X |
| 3,977,582 | 8/1976 | McMahon | 224/901 X |
| 4,310,110 | 1/1982 | Dexter | 224/250 X |
| 4,325,503 | 4/1982 | Swinney | 224/148 |
| 4,337,883 | 7/1982 | Pate | 224/253 X |
| 4,345,704 | 8/1982 | Boughton | 224/901 |
| 4,420,104 | 12/1983 | DiLenno | 224/253 X |
| 4,496,088 | 1/1985 | Tuthill | 224/253 |
| 4,570,835 | 2/1986 | Criqui et al. | 224/148 X |
| 4,588,116 | 5/1986 | Litman | 224/253 |

Primary Examiner—Renee S. Luebke
Attorney, Agent, or Firm—Gifford, Groh, Sheridan, Sprinkle and Dolgorukov

[57] ABSTRACT

A holder for carrying a vacuum bottle and like containers includes, in one embodiment of the invention, an open cylindrical resilient band having two ends. On one end is adhesive that coacts with the complementary surface of the other end to secure a vacuum bottle encompassed by the cylindrical band. A looped protrusion is provided for supporting the cylindrical band on a person's apparel, such as a belt.

In another embodiment of the present invention, the cylindrical band is carried on one end of a strut having at the other end a support for the bottom of the vacuum bottle. When the vacuum bottle is placed on the support and the band encompasses the bottle, the strut and bottle can be carried on a person's apparel, on a belt for example.

2 Claims, 1 Drawing Sheet

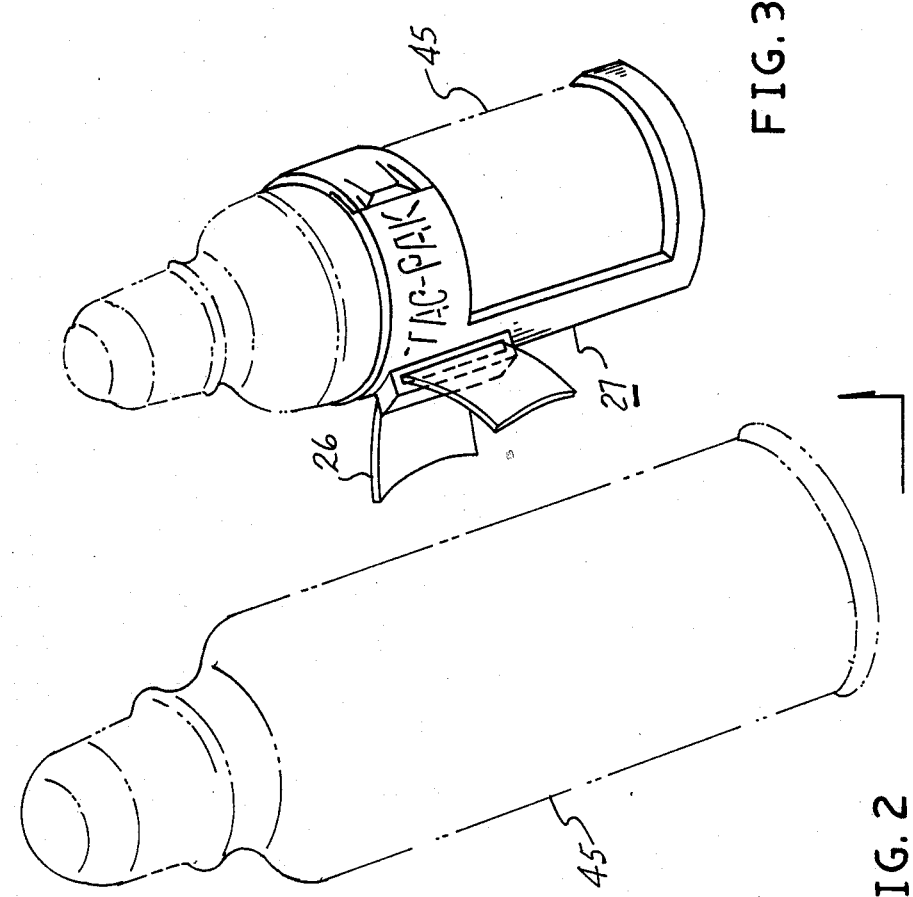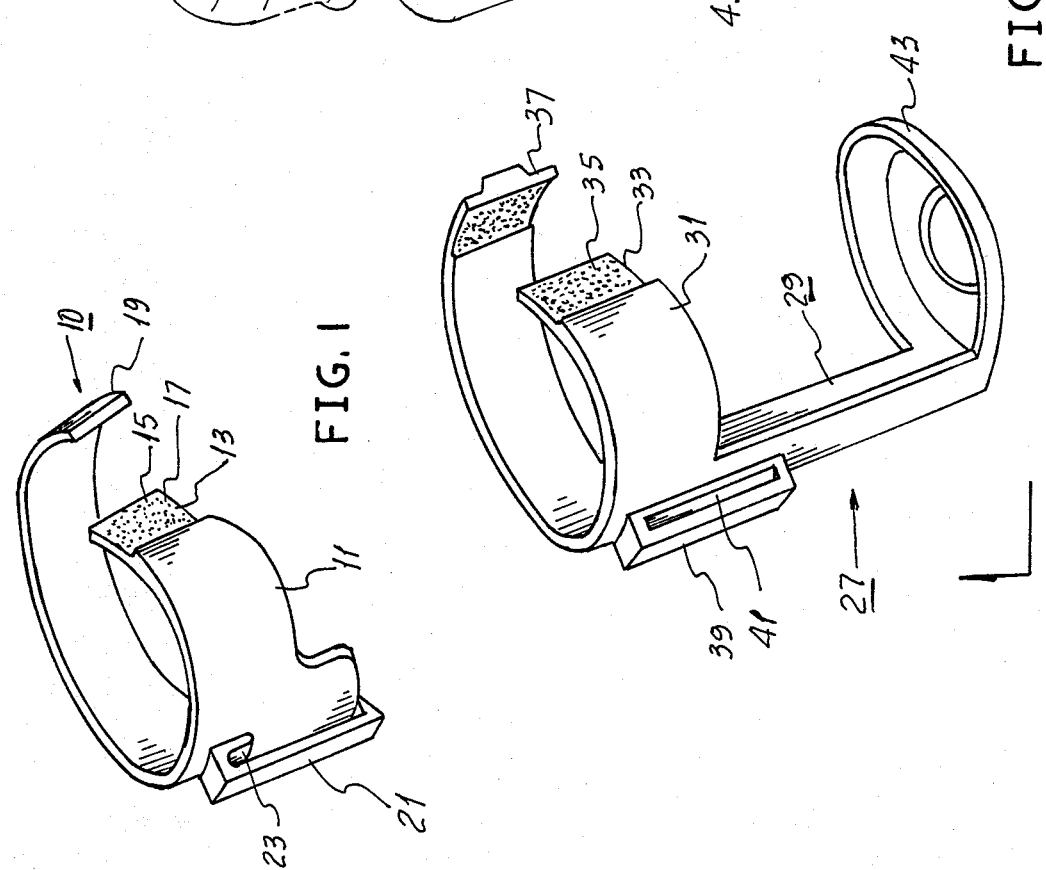

VACUUM BOTTLE HOLDER

BACKGROUND OF THE INVENTION

1. Field

The present invention relates generally to holding devices and, more particularly, to a portable device for holding a vacuum bottle such as a conventional THERMOS (trademark) bottle. The holding device of the present invention is adaptable to be suspended from a belt, worn around the waist of a person. But, the device may be mounted to a movable apparatus such as a golf pull cart or motorized golf car.

2. Prior Art

The prior art is replete with various kinds of portable holders for tools, tennis balls, flashlights and the like. Some representative prior art are:

U.S. Pat. No. 4,457,462 to Taormina discloses a tool holder for supporting a tool and the tool holder is adapted to be supported by the belt worn by a workman;

U.S. Pat. No. 4,372,468 to Harvey discloses a snap-lock device for securing and supporting a hammer or other like tool from the belt of a workman;

U.S. Pat. No. 4,269,338 to Sichel discloses a ball holder for tennis balls that may easily be attached to clothing worn by the tennis player; and U.S. Pat. No. 4,214,688 to Griffin, Jr. discloses a tool mounting assembly for removably mounting and positioning a tool such as a flashlight.

While these prior art devices may be representative of some holders, the present invention is distinct and unobvious from these prior art disclosures.

SUMMARY OF THE INVENTION

A holder device for a vacuum bottle comprises an open cylindrical band having two ends. On one end portion is means for coacting with other means on the other end portion that, when the two end portions are in contact, removably secures the band around a vacuum bottle. A belt loop is formed on the band for receiving a belt worn by a person.

In a modification of the invention, the holder device is connected to one end of a main body portion having a support at the other end that engages the bottom of a vacuum bottle. When the two ends of the cylindrical band engage, the vacuum bottle is securely held by the holder device.

It is an object of the present invention to provide a simple, inexpensive holder and carrier for a vacuum bottle.

The many other objects and advantages of the present invention will become apparent to those skilled in the art when the following description of the best modes contemplated at present for practicing the invention are read in conjunction with the accompanying drawing, wherein like reference numerals refer to like or equivalent parts.

BRIEF DESCRIPTION OF THE DRAWING

Referring now to the drawing:

FIG. 1 is a schematic view of one embodiment of a holder device for a vacuum bottle in accordance with the invention;

FIG. 2 is a schematic view of another embodiment of a holder device for a vacuum bottle in accordance with the invention; and FIG. 3 is a schematic view of the holder device of FIG. 2 as it appears when holding a vacuum bottle.

DETAILED DESCRIPTION

Referring to FIG. 1, a holder device 10 in accordance with one embodiment of the invention comprises a relatively thin circular band 11 that is provided at one end 13 with a recessed area 15 and means 17 thereon that secures the other end 19 of the circular band 11 in a surrounding and holding relationship with a vacuum bottle or the like device (not shown). The means 17 on the recessed area 15 may be adhesive with a paper release or other type of adhesive material. The outside of the circular band 11 is provided with a protrusion 21, rectangular in shape, that has a thin rectangular aperture 23 through it to receive a belt such as a workman's belt (shown partially as a belt 26 in FIG. 3) or the belt of another person.

The circular band 11 may be made preferably of a suitable plastic material that is formable and resilient so as to be conformable to a conventional vacuum bottle.

Referring to FIG. 2, a holder device 27 in accordance with another embodiment of the invention comprises a vertical main body portion 29 having an arcuate cross-section. At the top of the main body portion 29 is a cylindrical band 31 that is like the cylindrical band 11 shown in FIG. 1 and described previously herein, except that the surface of a recessed area 33 on one end of the band 31 may be covered with one type (loops or hooks) of VELCRO (trademark for a fastening system having one surface of tiny hooks and a complementary surface of an adhesive pile) 35, and the other end 37 of the circular band 31 may have on its inner surface a mating type (hooks or loops) of the VELCRO (trademark) 35.

The band 31, is made preferably of a suitable plastic material that is formable and resilient like the material of the band 11. The band 31 also has a protrusion 39 that is rectangular in shape, and has a thin rectangular aperture 41 therethrough to receive a belt or the like such as a belt (shown partially as the belt 26 in FIG. 3) worn by a workman or other person.

The lower or bottom end of the vertical main body portion 29 is provided with a saucer-like receptacle 43 that is receptive to the bottom portion of a conventional vacuum bottle 45 shown in phantom.

FIG. 3 shows the holder device 27 of FIG. 2 with the vacuum bottle 45 secured in the holder 27 of FIG. 2; the cylindrical band 31 surrounding the bottle with the ends of the band coacting.

To use the vacuum bottle holder 10 of the present invention, one places the band 11 around the vacuum bottle 45 and then overlaps end portion 19 on the recessed end portion 13, suitable adhesive or other connective medium having been applied to the mating surfaces to hold the band in an encompassing relation with the vacuum bottle.

In the case of the vacuum bottle holder 27 of FIG. 2, the vacuum bottle 45 is situated on the receptacle 43 and then it is placed within the band 31 at the top of the main body portion 29. The end portion 37 is then overlayed on the recessed end portion 33 and the VELCRO (trademark) on each end portion, being complementary, secures the vacuum bottle 45 in the holder 27.

Finally, the vacuum bottle holders 10 and 27 may be supported by a belt or the like passing through the protrusions 21 and 39 of each holder 10 and 27.

Although the invention has been described herein with a certain degree of particularity, it is understood that other modifications may be made therein without departing from the scope of the present invention as defined by the following claims.

What is claimed is:

1. A holder device for carrying a vacuum bottle comprising:
    an open cylindrical resilient band having a first end and a second end;
    means for engaging said first and second ends of said band to each other to tightly encircle said vacuum bottle and thereby secure said vacuum bottle in said holder;
    means on said band for connecting it to a movable object;
    said means for engaging further comprising loop and pile fastener portions which, upon engagement, are detachably secured together;
    each of said band ends having a recessed region defined therein; and
    said loop and pile fastener portions being provided on said recessed regions.

2. The vacuum bottle holder of claim 1 wherein said means for connecting said band to a movable object comprises a protrusion on said holder having an aperture receptive to a belt worn by a person.

* * * * *